United States Patent [19]

Carroll

[11] Patent Number: 4,936,647
[45] Date of Patent: Jun. 26, 1990

[54] HIGH TENSILE STRENGTH COMPACTED TOWING CABLE WITH SIGNAL TRANSMISSION ELEMENT

[75] Inventor: David W. Carroll, Doylestown, Pa.

[73] Assignee: Babcock Industries, Inc., Doylestown, Pa.

[21] Appl. No.: 241,292

[22] Filed: Sep. 7, 1988

Related U.S. Application Data

[63] Continuation-in-part of Ser. No. 734,736, May 15, 1985, Pat. No. 4,778,246.

[51] Int. Cl.⁵ .................................................. G02B 6/44
[52] U.S. Cl. ................................. 350/96.23; 174/128.1
[58] Field of Search .................... 350/96.23; 174/115, 174/128 R, 129 R, 129 S, 130, 131 R, 131 A; 57/215, 3.5, 9

[56] References Cited

U.S. PATENT DOCUMENTS

| | | | |
|---|---|---|---|
| 3,234,722 | 2/1966 | Gilmore | 57/145 |
| 3,444,684 | 5/1969 | Schoerner et al. | 57/215 |
| 3,778,993 | 12/1973 | Glushko et al. | 57/215 |
| 3,872,659 | 3/1975 | Campbell et al. | 57/215 |
| 3,956,877 | 5/1976 | Gilmore | 57/215 |
| 4,270,341 | 6/1981 | Glushko et al. | 57/215 |
| 4,311,001 | 1/1982 | Glushko et al. | 57/215 |
| 4,342,500 | 8/1982 | Oestreich et al. | 350/96.23 |
| 4,401,361 | 8/1983 | Slaughter | 350/96.23 |
| 4,469,962 | 9/1984 | Snyder | 307/453 X |
| 4,538,023 | 8/1985 | Brisson | 174/115 |
| 4,558,235 | 12/1985 | White et al. | 307/443 X |
| 4,638,188 | 1/1987 | Cray | 307/450 X |
| 4,657,342 | 4/1987 | Baüer | 350/96.23 |
| 4,700,086 | 10/1987 | Ling et al. | 307/481 X |
| 4,713,559 | 12/1987 | Vu et al. | 307/450 X |
| 4,748,347 | 5/1988 | Tung | 307/453 X |
| 4,778,246 | 10/1988 | Carroll | 174/115 |
| 4,780,626 | 10/1988 | Guerin et al. | 307/453 X |
| 4,798,972 | 1/1989 | Melanson et al. | 307/448 X |
| 4,810,905 | 3/1989 | Graham et al. | 307/450 X |

*Primary Examiner*—Frank Gonzalez
*Attorney, Agent, or Firm*—Pennie & Edmonds

[57] ABSTRACT

A high tensile strength transmission cable having a plurality of main compacted strands. The strands surround, and are adjacent to, an uncompacted core which may form or contain one or more signal transmission elements such as fiber-optic or electrical cable members.

9 Claims, 2 Drawing Sheets

HIGH TENSILE STRENGTH COMPACTED TOWING CABLE WITH SIGNAL TRANSMISSION ELEMENT

CROSS-REFERENCE TO RELATED APPLICATIONS

This application is a continuation-in-part of Ser. No. 734,736 filed May 15, 1985, now U.S. Pat. No. 4,778,246, granted Oct. 18, 1988.

FIELD OF THE INVENTION

This invention relates to a high tensile strength signal transmission cable and a method of making the same. More specifically, the invention concerns a transmission cable made from a pre-compacted cable having a plurality of compacted strands originally surrounding a hard core. The hard core is removed and replaced with a soft uncompacted core which may contain one or more optical or electrical signal transmission elements.

BACKGROUND OF THE INVENTION

Towed targets, either aerial or underwater, require tow cables which can withstand high tensile loads resulting from the drag of the target being pulled through an air or water medium. Cables as currently used are 1×19 strand compacted armored cables having eighteen strand wires surrounding a center core wire, compacted 1×7 strand cables comprising six strand wires surrounding a center core wire and double-compacted 3×7 cables comprising three strands without a center core strand where each strand itself comprises six strand wires surrounding a center core wire.

In order to reduce the diameter and cross-sectional bulk of such cables and thus drag forces imparted as the cables move through air or water, they are compacted by swaging tools. That is, the round cross-section of the individual strands are permanently deformed in the swaging operation. This reduces the drag of the cable when towed through a medium and increases the strength-to-diameter ratio.

The 1×19 and 1×7 cables are subjected to one compacting operation, whereas in the case of the double compacted 3×7 cable, each 1×7 strand is subjected to one compacting operation and the three 1×7 strands are then subjected to a second compacting operation.

While such cables provide sufficient tensile strength, have a high strength-to-diameter ratio, and are torsionally stable, they lack any transmission capabilities by which electrical power, electrical signals or optical signals may be transmitted between the towed target and the towing vehicle. With the more sophisticated targets being currently used, it is often desirable to connect the target to power sources to actuate infrared transmitters on the target or to provide the target with hit indicators which may transmit hit signals to the towing vehicle.

Coaxial cables have been proposed to provide both tensile strength and transmitting qualities. Such cables comprise concentric layers of electrical conductors and tensile strength elements separated by layers of insulation, with the result that the cables have poor torsional stability which limits their utility.

It has also been proposed to combine tensile strength elements along with electrical conductors having shielding or to use optical fibers and hollow conductive elements arranged within a protective matrix to provide a cable having both high tensile strength and signal transmitting capabilities. However, transmitting elements, particularly hollow conduits or optical fibers, cannot be subjected to compacting operations without damage, with the result that such cables have a low maximum strength-to-diameter ratio such that their drag characteristics are objectionable.

It is therefore an object of my invention to provide a high tensile strength signal transmission cable, compacted such that at least the outermost round cross section tensile strength elements are permanently deformed in both cross section and helix position, so as to substantially eliminate void spaces between adjacent elements, to reduce drag when towed as compared to an uncompacted cable, and also to eliminate any tendency to unravel when cut, and which has at least one signal transmission element therein.

It is a further object of my invention to provide a method by which a high tensile strength compacted cable comprising at least one signal transmission element may be made in which the signal transmission element(s) are not subjected to the compaction forces required to permanently alter the cross sections of the high tensile strength strands of the cable.

BRIEF DESCRIPTION OF THE DRAWINGS

Referring to the drawings.

DESCRIPTION OF THE PREFERRED EMBODIMENTS

Figure 1:
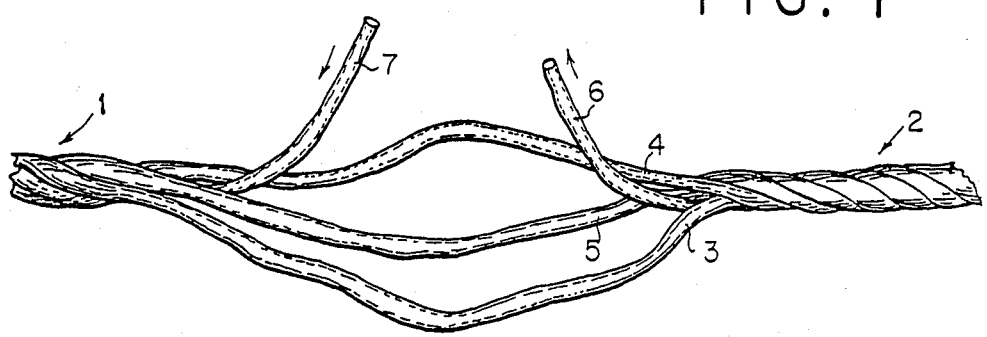
FIG. 1 is a diagrammatical view of a high tensile strength transmission cable in the process of being constructed according to the invention, illustrating removal of a hard center core wire from an open pre-compacted multi-strand cable and subsequent insertion of a relatively soft core into the open cable.

Referring to FIG. 1 there is illustrated a high tensile strength signal transmission cable 1 constructed according to the invention which is formed from a conventional precompacted cable 2. Cable 2, shown in cross-section in FIGS. 2 and 3, has three main strands 3, 4 and 5 which are initially round, which are typically metallic, and are compacted in a swaging operation or the like to take a permanently noncircular cross-section. Strands 3, 4 and 5 are twisted around a hard core wire 6, which may be coated by coating 10.

As shown on the right side of FIG. 1, the hard core wire 6 is first removed from a laid open that is, partially untwisted portion of the cable 2. As shown on the left side of FIG. 1, the hard core wire 6 is taken replaced by a core 7 which may be of a softer material which is inserted between the open strands 3, 4 and 5 after which the strands are closed again, that is, twisted together to reform the cable 1. The core 7 may comprise a multi-conductor cable for carrying electrical signals or a fiber optic cable. The core 7 is not compacted upon reclosing of the strands 3, 4, and 5 to reform the cable.

Figure 2:
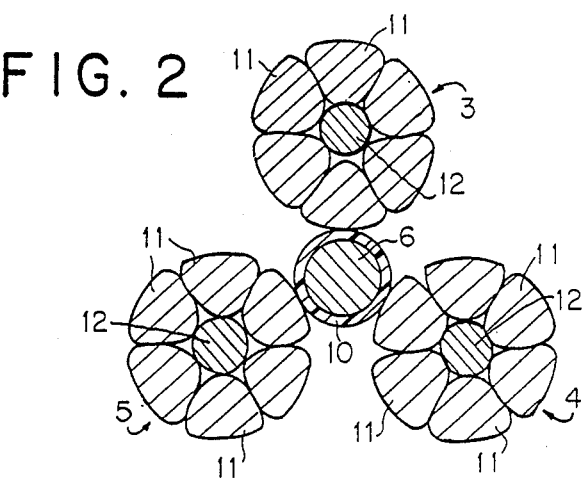
FIG. 2 is a cross-sectional view of a multi-strand cable in which the individual strands have been compacted prior to the strands being compacted together about a hard center core wire.

As shown in FIG. 2, each of the main strands 3, 4 and 5 may in turn typically comprise six secondary strand wires 11 surrounding a hard center core strand wire 12. Main strands 3, 4 and 5 are initially pre-compacted about the hard core wire 12, such that each structural element is deformed permanently to conform to a non-circular cross section, thus reducing voids between adjacent wires, and also is permanently deformed with respect to helix position. The extent of the permanent deformation is such that any element removed from the strand will not return to its pre-deformed state and can be returned to its compacted position in the strand. Compacting may be accomplished by, for example, a conventional swaging operation to reduce the diameters of the strands and to provide deformation and compaction of the secondary strands 11.

Figure 3:
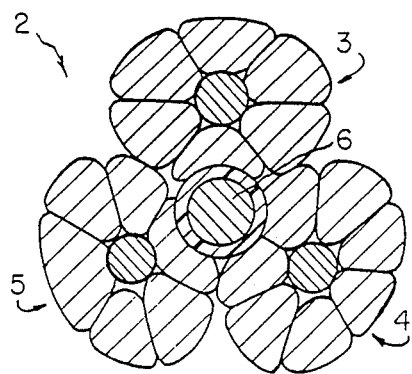
FIG. 3 is a view similar to FIG. 2 after the strands of the cable have been completely compacted together about a center core wire so that adjacent strands contact each other.

Referring to FIG. 3 it is seen that main strands 3, 4 and 5 may be further compacted around the hard core wire 6 by a second compacting operation such that the overall cable assembly 2 achieves a cross-sectional configuration having a maximized strength-to-diameter ratio. In this particular configuration, the strands are compacted to such an extent that adjacent strands contact and may be further deformed by each other.

Figure 5:
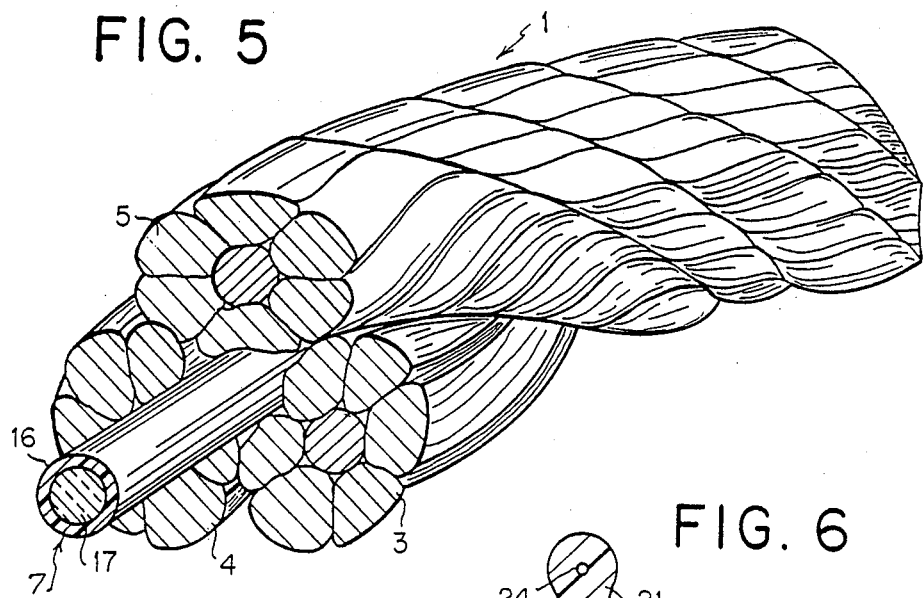
FIG. 5 is a perspective view of a cable constructed according to the invention having an optical fiber or electrical transmission element therein.

Referring to FIG. 5, the complete cable 1 is illustrated. After the second compacting operation, the hard core wire 6 is removed from cable 2 and replaced by a core 7 which, as shown, is of circular configuration of substantially the same diameter as the hard core wire it replaces. The core 7 may comprise an optical fiber comprising a core 17 and a coating 16, a relatively soft wire serving as a transmission element, or a tubular member having further transmission elements therein. The core 7 is preferably coated with a lubricant so that the strands may slide relatively with respect to the core during flexure of the cable 1.

The core 7 may be softer than the strands 3, 4 and 5; since it is not compacted according to invention, it may also be relatively fragile. The core normally need not contribute to the overall tensile strength of the cable 1.

It is obvious by comparing FIG. 5 with FIG. 3 that the cable 1 has substantially the same diameter as that of cable 2 in FIG. 3, so that both have relatively high tensile strength-to-diameter-ratio characteristics. This is true even though the core 7 comprising the transmission element could not be subjected to a compacting force without damage, and even though it may be undesirable to subject the core 7 to tensile loading. Thus it is seen in FIG. 5 that the cable 1 has high tensile strength properties which are imparted by the main strands 3, 4 and 5 while also having a transmission element 7 by which signals may be transmitted along the length of the cable, as for example, between a towed target and a towing vehicle.

Figure 4:
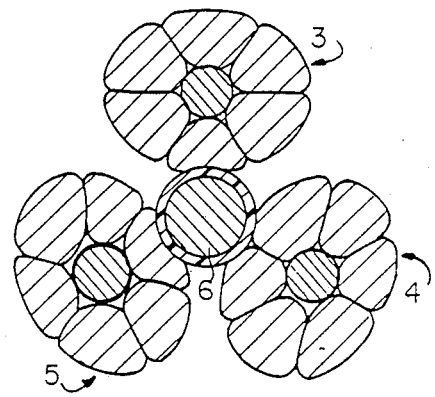
FIG. 4 is a view similar to FIG. 3 after the strands of the cable have been partially compacted together about a hard core wire to leave a space between adjacent strands.
Figure 6:
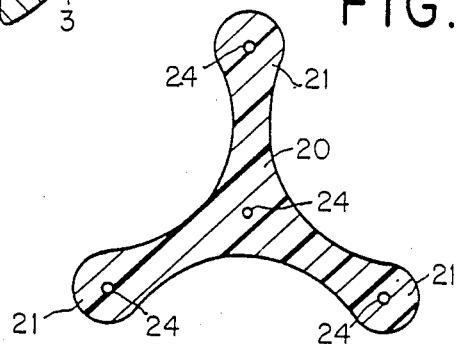
FIG. 6 is a cross-sectional view of a center core member constructed according to a further embodiment of the invention comprising an insulative member having signal transmission elements embedded therein.
Figure 7:
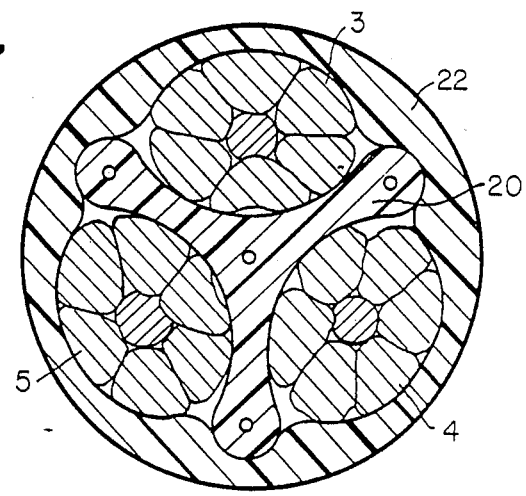
FIG. 7 is a cross-sectional view of a cable construction according to the invention utilizing the core of FIG. 6.

Referring to FIG. 4, there is illustrated a cross-sectional view of the cable 2 in a second embodiment in which the main strands 3, 4 and 5 are not compacted to the same extent as that shown in FIG. 3, such that a space remains between adjacent strands. This configuration may be employed where it is desired to accommodate a ribbed core 20 as shown in FIGS. 6 and 7. The ribbed core 20 may comprise an electrically non-conductive material, for example, a nonconductive plastic material. The core 20 may comprise three or more ribs or arms 21 which, as shown in FIG. 7, extend between adjacent main strands 3, 4 and 5 so as to insulate adjacent strands from one another.

The main strands 3, 4 and 5 are again compacted prior to their assembly with core member 20; this can be done be swaging them around a removable core precursor or a hard core wire, as in the FIG. 1 embodiment, removing this, and then replacing it with the core 20, or by swaging the strands 3, 4 and 5 individually and assembling them over the core member 20.

Typically, the resulting cable construction comprises a plastic sheath 22 surrounding the main strands 3, 4 and 5 so that the strands are encased within the sheath and so that the main strands are insulated from one another. In this form of the invention, the main strands themselves may comprise electrically conductive elements whereby the strands act as power or signal leads extending between a towed target and a towing. The core 20 may in addition include one or more transmission elements 24, in the form of electrically conductive elements or optical fibers, embedded in the ribs and/or the center of the ribbed core 20, through which signals are transmitted.

While I have disclosed a compacted cable comprising three compacted main strands surrounding a softer core and wherein each main strand comprises a plurality of secondary strand wires, the invention contemplates other numerical combinations of compacted main strands alone or combined with compacted secondary strands. For example and with reference to FIG. 1, the main strands 3, 4 and 5 as shown could each comprise a single wire wherein the resulting construction would be a 1×4 cable construction with three compacted strands surrounding an uncompacted core. Other numerical combinations could be employed. Similarly, the ribbed core element 20 could be changed accordingly, for example, to provide ribs extending between each of six adjacent main strands.

The method of manufacture of a cable according to the invention is generally as follows. The cable 2 as shown in FIG. 1 having a multiplicity of main strands which have been pre-compacted and which surround a hard core wire are further compacted about the hard core wire 6 to an extent such that the main strands contact and may be further deformed by each other. If a plastic core of the type shown in FIGS. 6 and 7 is to be used, the compaction is carried out such that a space is left between adjacent main strands. The main strands are opened, after which, as shown in FIG. 1, the hard core wire 6 is removed. Immediately after removal of the hard core wire, a signal transmitting core 7 is inserted between the open main strands 3, 4 and 5 after which the main strands are reclosed to form the cable 1.

Where it is contemplated that the main strands 3, 4 and 5 themselves will act as transmission elements, the core 7 would be substituted by the ribbed plastic core 20, to insulate the strands from one another, and the process would include the additional step of thereafter encasing the main strands 3, 4 and 5 and core 20 within the plastic sheath 22.

It will be appreciated that there are numerous modifications and improvements which can be made to the cable of the invention without departure from its spirit and scope, and these are to be considered within the scope of the appended claims where not specifically excluded. In particular, note that it may be desirable to employ aramid, carbon fiber, or other non-metallic strands as the permanently deformed tensile elements of the cable or the invention. Therefore, the present invention is not limited by the above exemplary disclosure, but only by the appended claims.

I claim:

1. A composite high tensile strength towing cable, comprising:

an outer cable structure formed of a plurality of strands, said strands having been initially of circular cross-sectional shape and having been compacted into one another while surrounding a central element, such that the cross-sectional shape of each of said strands is permanently deformed from said initial circular shape to a final non circular shape; and a central fragile non-deformed signal transmission element in intimate contact with and surrounded by said plurality of strands.

2. The cable of claim 1, wherein said signal transmission element comprises one or more optical fibers.

3. The cable of claim 1, wherein the central element comprises one or more electrical conductors.

4. The cable of claim 1, wherein said strands each comprises multiple strands.

5. The cable of claim 1, wherein said strands are of a metallic material.

6. The cable of claim 1, wherein said strands are of a nonmetallic material capable of permanent deformation.

7. The cable of claim 1 wherein said central signal transmission element is encased by an elongated ribbed core member of an insulative material having a central portion and a plurality of ribs extending radially outwardly from said central portion, said ribs extending outwardly between said strands, so as to electrically isolate said strands from one another.

8. The cable of claim 7 wherein said ribbed core member has one or more additional signal transmissive elements embedded therein.

9. The cable of claim 8 further comprising a sheath over the strands, the central element and the ribbed core member.

* * * * *